(12) United States Patent
Khatri et al.

(10) Patent No.: US 11,816,252 B2
(45) Date of Patent: Nov. 14, 2023

(54) MANAGING CONTROL OF A SECURITY PROCESSOR IN A SUPPLY CHAIN

(71) Applicant: Dell Products, L.P., Round Rock, TX (US)

(72) Inventors: Mukund P. Khatri, Austin, TX (US); Eugene David Cho, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 17/372,619

(22) Filed: Jul. 12, 2021

(65) Prior Publication Data

US 2023/0018085 A1    Jan. 19, 2023

(51) Int. Cl.
| | |
|---|---|
| *G06F 15/177* | (2006.01) |
| *G06F 9/00* | (2006.01) |
| *G06F 21/71* | (2013.01) |
| *H04L 9/30* | (2006.01) |
| *G06F 21/57* | (2013.01) |

(52) U.S. Cl.
CPC ............ *G06F 21/71* (2013.01); *G06F 21/575* (2013.01); *H04L 9/30* (2013.01); *G06F 2221/033* (2013.01)

(58) Field of Classification Search
CPC .. G06F 21/71; G06F 21/575; G06F 2221/033; H04L 9/30; H04L 9/0897; H04L 9/14
See application file for complete search history.

(56) References Cited

U.S. PATENT DOCUMENTS

| | | | |
|---|---|---|---|
| 2016/0070932 A1* | 3/2016 | Zimmer ................. G06F 21/53 713/192 |
| 2017/0083709 A1* | 3/2017 | Simmons ............ G06F 21/6218 |
| 2021/0103661 A1* | 4/2021 | Wu ........................ G06F 21/572 |
| 2022/0327243 A1* | 10/2022 | Singh ...................... G06F 21/64 |
| 2022/0382872 A1* | 12/2022 | Sakib ................... H04L 9/0894 |
| 2022/0382873 A1* | 12/2022 | Soni ...................... G06F 21/572 |

\* cited by examiner

*Primary Examiner* — Xuxing Chen
(74) *Attorney, Agent, or Firm* — Fogarty LLP

(57) ABSTRACT

Embodiments of systems and methods for managing control of a security processor in a supply chain are described. In some embodiments, a security processor may include: a core; and a memory coupled to the core, the memory having program instructions stored thereon that, upon execution by the core, cause the security processor to: store a first public key usable to initiate a first secure boot process and unusable to initiate a second secure boot process; store a second public key usable to initiate the second secure boot process and unusable to initiate the first secure boot process; and in response to a first change of control or ownership of the security processor, render the first public key unusable to initiate the first secure boot process.

19 Claims, 10 Drawing Sheets

| CAN INVALIDATE BOOTING | INV 14? | INV 13? | INV 12? | INV 11? | INV 10? | INV 9? | INV 8? | INV 7? | INV 6? | INV 5? | INV 4? | INV 3? | INV 2? | INV 1? | INV 0? |
|---|---|---|---|---|---|---|---|---|---|---|---|---|---|---|---|
| PK14 | Y | Y | Y | Y | Y | Y | Y | Y | Y | Y | Y | Y | Y | Y | Y |
| PK13 |   | Y | Y | Y | Y | Y | Y | Y | Y | Y | Y | Y | Y | Y | Y |
| PK12 |   |   | Y | Y | Y | Y | Y | Y | Y | Y | Y | Y | Y | Y | Y |
| PK11 |   |   |   | Y | Y | Y | Y | Y | Y | Y | Y | Y | Y | Y | Y |
| PK10 |   |   |   |   | Y | Y | Y | Y | Y | Y | Y | Y | Y | Y | Y |
| PK9  |   |   |   |   |   | Y | Y | Y | Y | Y | Y | Y | Y | Y | Y |
| PK8  |   |   |   |   |   |   | Y | Y | Y | Y | Y | Y | Y | Y | Y |
| PK7  |   |   |   |   |   |   |   | Y | Y | Y | Y | Y | Y | Y | Y |
| PK6  |   |   |   |   |   |   |   |   | Y | Y | Y | Y | Y | Y | Y |
| PK5  |   |   |   |   |   |   |   |   |   | Y | Y | Y | Y | Y | Y |
| PK4  |   |   |   |   |   |   |   |   |   |   | Y | Y | Y | Y | Y |
| PK3  |   |   |   |   |   |   |   |   |   |   |   | Y | Y | Y | Y |
| PK2  |   |   |   |   |   |   |   |   |   |   |   |   | Y | Y | Y |
| PK1  |   |   |   |   |   |   |   |   |   |   |   |   |   | Y | Y |
| PK0  |   |   |   |   |   |   |   |   |   |   |   |   |   |   | Y |

| COUNTER (OTP/FUSES) | WHICH PUBLIC KEYS DOES SECURE BOOT USE? | |
|---|---|---|
| 0000 | ✓ | ✓ (RENTER 0) — 1201 |
| 0001 | ✓ | ✓ (RENTER 1) — 1202 |
| 0011 | ✓ | ✓ (RENTER 2) — 1203 |
| 0111 | ✓ | ✓ (RENTER 3) — 1204 |
| 1111 | ✓ | — 1205 |

1300

| FIRST COUNTER (OTP/FUSES) | SECOND COUNTER (OTP/FUSES) | WHICH PUBLIC KEYS DOES SECURE BOOT USE? | |
|---|---|---|---|
| 0000 | 0000 | ✓ | — 1301 |
| 0001 | 0000 | | ✓ (RENTER 0) — 1302 |
| 0001 | 0001 | ✓ | — 1303 |
| 0011 | 0001 | | ✓ (RENTER 1) — 1304 |
| 0011 | 0011 | ✓ | — 1305 |
| 0111 | 0011 | | ✓ (RENTER 2) — 1306 |
| 0111 | 0111 | ✓ | — 1307 |
| 1111 | 0111 | | ✓ (RENTER 3) — 1308 |
| 1111 | 1111 | ✓ (RMA) | — 1309 |

MANAGING CONTROL OF A SECURITY PROCESSOR IN A SUPPLY CHAIN

FIELD

The present disclosure relates generally to Information Handling Systems (IHSs), and more particularly, to systems and methods for managing control of a security processor in a supply chain.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for managing control of a security processor in a supply chain are described. In an illustrative, non-limiting embodiment, a security processor may include: a core; and a memory coupled to the core, the memory having program instructions stored thereon that, upon execution by the core, cause the security processor to: store a first public key usable to initiate a first secure boot process and unusable to initiate a second secure boot process; store a second public key usable to initiate the second secure boot process and unusable to initiate the first secure boot process; and in response to a first change of control or ownership of the security processor, render the first public key unusable to initiate the first secure boot process.

The first secure boot process may exclude access to a first set of one or more selected controllers, and the second secure boot process may exclude access to a second set of one or more selected controllers. The first set of one or more selected controllers may include a fuse controller, and wherein the second set of one or more selected controllers may exclude the fuse controller. The second set of one or more controllers may include at least one of: a Universal Serial Bus (USB) controller, a network controller, or a storage controller.

The first and second public keys may be fused into the security processor. In some cases, a first entity may be associated with a first secure boot public key, a second entity may be associated with the second secure boot public key, and the first change of control or ownership may be from the first entity to the second entity. For example, the first entity may be an Original Equipment Manufacturing (OEM) entity, and the second entity may be a customer or brand of the OEM entity.

The security processor may include comprising a first counter configured to be incremented in response to the first change of control or ownership and a second counter configured to be incremented in response to a second change of control or ownership of the security processor from the second entity to the first entity, where to render the first public key unusable to initiate the first secure boot processes, the program instructions, upon execution by the core, further cause the security processor to read the first and second counters.

The program instructions, upon execution by the core, may further cause the security processor to, in response to the second change of control or ownership: render the second public key unusable to initiate the second secure boot process, and render the first public key usable to initiate the first secure boot process. The second change of control or ownership may be associated with an equipment return, service, or warranty claim.

To render the first or second public keys usable or unusable to initiate the first or second secure boot processes, the program instructions, upon execution by the core, may further cause the security processor to read the first and second counters.

The program instructions, upon execution by the core, may further cause the security processor to: store a third public key usable to initiate a third secure boot process and unusable to initiate the first and second secure boot processes; and in response to a third change of control or ownership of the security processor from the first entity to a third entity, render the first public key unusable to initiate the first secure boot process. The third entity may be another customer or brand of the OEM entity. The first counter may be configured to be incremented in response to the third change of control or ownership, and to render the first public key unusable to initiate the first secure boot process, the program instructions, upon execution by the core, may further cause the security processor to read the first and second counters.

In another illustrative, non-limiting embodiment, a memory storage device may have program instructions stored thereon that, upon execution by an Information Handling System (IHS) under control or ownership of an OEM entity, cause the IHS to: initiate a first secure boot process using a first public key fused into a security processor, where the first public key is usable to initiate a first secure boot process, and where the first secure boot process excludes access to a first set of one or more controllers; and in response to a change of control or ownership of the IHS from the OEM entity to a customer entity, increment a first one-way counter within the security processor, wherein the incremented first one-way counter renders: (i) the first public key unusable to initiate the first secure boot process, and (ii) a second public key fused into the security processor usable to initiate the second secure boot process, where the second secure boot process excludes access to a second set of one or more controllers.

The the program instructions, upon execution, may further cause the IHS to, in response to a change of control or ownership of the IHS from the customer entity to the OEM entity, increment a second one-way counter within the security processor, where the incremented second one-way counter renders the first public key usable to initiate the first secure boot process and the second public key unusable to initiate the second secure boot process.

The program instructions, upon execution, may further cause the IHS to, in response to another change of control or ownership of the IHS from the OEM entity to another entity, re-increment the first one-way counter within the security processor, where the re-incremented first one-way counter renders the first public key unusable to initiate the first secure boot process and a third public key fused into the security processor usable to initiate a third secure boot process.

In yet another illustrative, non-limiting embodiment, a method may include initiating, by a second entity, a second secure boot process of an IHS using a second public key fused into a security processor of the IHS, where the second secure boot process excludes access to a second controller; and in response to a change of control or ownership of from the second entity to a first entity, incrementing a second one-way counter within the security processor, where the incremented second one-way counter renders: (i) the second public key unusable to initiate the second secure boot process, and (ii) a first public key fused into the security processor usable to initiate a first secure boot process, wherein the first secure boot process excludes access to a first controller.

The first entity may be an OEM entity, the second entity may be a customer or brand of the OEM entity, and the change of control or ownership may be associated with a return, service, or warranty claim. The first controller may include at least one of: a Universal Serial Bus (USB) controller, a network controller, and/or a storage controller, and the second controller may include a fuse controller.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 11 is a table illustrating an example of public keys usable by different entities to perform different secure boot operations, according to some embodiments.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
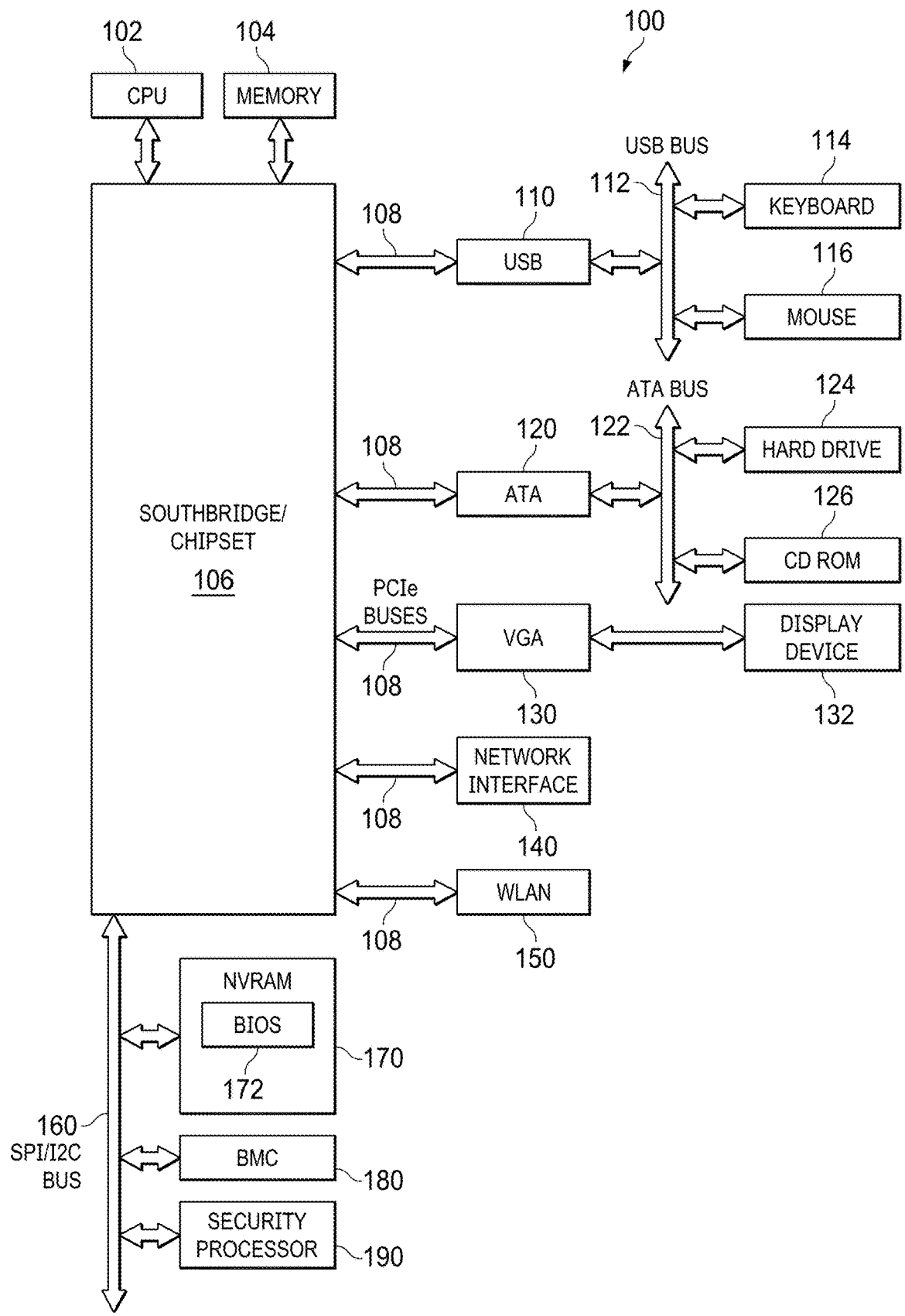
FIG. 1 is a block diagram of an example of hardware components of an Information Handling System (IHS) configured according to some embodiments.

FIG. 1 is a block diagram of an example of hardware components of IHS 100 configured according to some embodiments. As shown, IHS 100 includes processor 102, memory 104, southbridge/chipset 106, one or more Peripheral Component Interconnect-Express (PCIe) buses 108, Universal Serial Bus (USB) controller 110, USB bus 112, keyboard device controller 114, mouse device controller 116, Advanced Technology Attachment (ATA) bus controller 120, ATA bus 122, hard drive device controller 124, compact disk read only memory (CD ROM) device controller 126, Video Graphics Array (VGA) device controller 130, Network Interface Controller (NIC) 140, Wireless Local Area Network (WLAN) controller 150, Serial Peripheral Interface (SPI) bus 160, non-volatile RAM (NVRAM) 170 for storing Basic Input/Output System (BIOS) or Unified Extensible Firmware Interface (UEFI) 172, Baseboard Management Controller (BMC) 180, and security processor 190.

Chipset 106 may be directly connected to an individual endpoint via a PCIe root port within chipset 106 and a point-to-point topology as shown in FIG. 1. BMC 180 may be referred to as a service processor or embedded controller (EC). Capabilities and operations provided by BMC 180 can vary considerably based on the type of IHS 100. For example, the term BMC is often used to describe an embedded processor included in a server, while an EC is more likely to be found in a consumer-level device. Moreover, an EC included in a data storage system may be referred to as a storage enclosure processor. As disclosed herein, BMC 180 represents a processing device different from CPU 102, which provides various management operations for IHS 100. For example, an EC may be responsible for power management, cooling management, and the like. Moreover, BMC 180 may be configured to provide out-of-band access to devices at IHS 100. As used herein, out-of-band access herein refers to operations performed prior to execution of BIOS 172 by processor 102 to initialize operation of IHS 100.

IHS 100 may include additional processors that are configured to provide localized or specific control operations, such as a battery management controller. Bus 160 may include one or more busses, including a SPI bus, an $I^2C$ bus, a system management bus (SMBUS), a power management bus (PMBUS), and the like.

BIOS 172 may be referred to as a firmware image. BIOS 172 includes instructions executable by CPU 102 to initialize and test the hardware components of IHS 100, and to load a boot loader or an operating system (OS) from a mass storage device. BIOS 172 additionally provides an abstraction layer for the hardware, such as a consistent way for application programs and OSs to interact with the keyboard, display, and other input/output devices. When power is first applied to IHS 100, IHS 100 begins a sequence of initialization procedures. During the initialization sequence, also referred to as a boot sequence, components of IHS 100 are configured and enabled for operation, and device drivers can be installed. Device drivers provide an interface through which other components of IHS 100 can communicate with a corresponding device.

IHS 100 may include multiple processor cores, audio devices, and the like. While a particular arrangement of bus technologies and interconnections is illustrated for the purpose of example, a person of ordinary skill in the art will appreciate that the techniques disclosed herein are applicable to other IHS architectures. IHS 100 may include multiple CPUs and redundant bus controllers. One or more components may be integrated together. For example, portions of southbridge/chipset 106 may be integrated within CPU 102.

Additional components of IHS 100 may include one or more storage devices that can store machine-executable code, one or more communications ports for communicating with external devices, and various I/O devices, such as a keyboard, a mouse, and a video display. An example of IHS 100 includes a multi-tenant chassis system where groups of tenants (users) share a common chassis, and tenant has a unique set of resources assigned thereto. The resources can include blade servers of the chassis, I/O modules, PCIe cards, storage controllers, and the like.

IHS 100 may include a set of instructions that can be executed to cause it to perform any one or more of the methods or computer-based operations disclosed herein. IHS 100 may operate as a standalone device or may be connected to other computer systems or peripheral devices, such as by a network.

In a networked deployment, IHS 100 may operate in the capacity of a server or as a client user computer in a server-client user network environment, or as a peer computer system in a peer-to-peer (or distributed) network environment. IHS 100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, IHS 100 may be implemented using electronic devices that provide voice, video, or data communication.

IHS 100 may include a disk drive unit and may include a computer-readable medium in which one or more sets of instructions, such as software, can be embedded. Further, the instructions may implement one or more of the methods described herein. In a particular embodiment, these instructions may reside completely, or at least partially, within memory 104 or another memory included in IHS 100, and/or within CPU 102 during execution by IHS 100. System memory 104 and CPU 102 also may include computer-readable media.

Security processor 190 may be used to establish a hardware Root of Trust (RoT) within components of IHS 100. As used herein, the term RoT generally refers to one or more hardware components that operate using instructions that have been validated with regard to their authenticity and/or integrity. In the described embodiments, security processor 190 may implement boot processes that operate using code from an immutable source. Because the anchor for the root of trust is established by the security processor 190 using immutable source code, the RoT cannot be modified by unauthorized parties. Upon the IHS being booted, the security processor 190 executes self-tests and validation of its own firmware. If these tests pass, security processor 190 may then validate additional code to be used by the security processor or by other components of the IHS, thus expanding the RoT.

In existing systems, some of the capabilities of security processor 190 may be fulfilled by a Trusted Platform Module (TPM). The TPM is a hardware component used to help securely store keys and measurements that verify the integrity of the system. Although computer programs may use a TPM to authenticate hardware devices, the firmware instructions that are used by a TPM are not programmable or customizable.

In contrast with existing TPMs, when IHS 100 is powered up, security processor 190 executes firmware instructions located in an embedded read-only memory of the security processor. During its fabrication, one more protected memory devices that are accessible by security processor 190 are programmed with immutable code, sometimes known as the boot ROM, that may be trusted implicitly, but that may also be expressly validated using a provided reference signature.

In some instances, security processor 190 may run a Memory Built-In Self-Test (MBIST) on every boot to ensure that memory used by the processor in establishing the root of trust (including the boot ROM) has not been tampered with. If the integrity of the boot code is confirmed, security processor 190 may load the boot code firmware from memory.

Examples of commercially available security processors suitable to implement security processor 190 include, but are not limited to, the Samsung embedded Secure Element (eSE) family of chips, among others.

Figure 2:
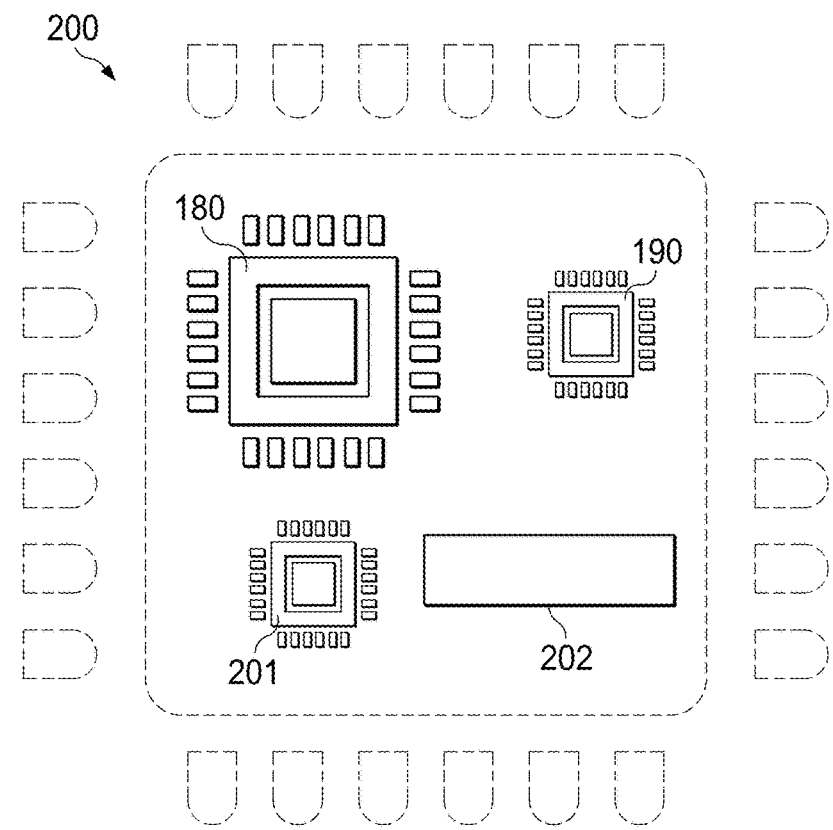
FIG. 2 is a diagram of a security chip comprising a security processor, according to some embodiments.

FIG. 2 is a diagram of an example of security chip 200 comprising security processor 190, according to some embodiments. As illustrated, security chip 200 may be coupled (e.g., soldered) to a motherboard hosting other components of IHS 100 (e.g., CPU 102, etc.). Security chip 200 may include security processor or core 190, BMC 180, offload CPU or hardware accelerator 201, and MROM 202 containing immutable code. In different implementations, security chip 200 may be manufactured as a Systems-On-Chip (SoC), Field-Programmable Gate Array (FPGA), Application-Specific Integrated Circuit (ASIC), Complex Programmable Logic Device (CPLD), or the like.

Figure 3:
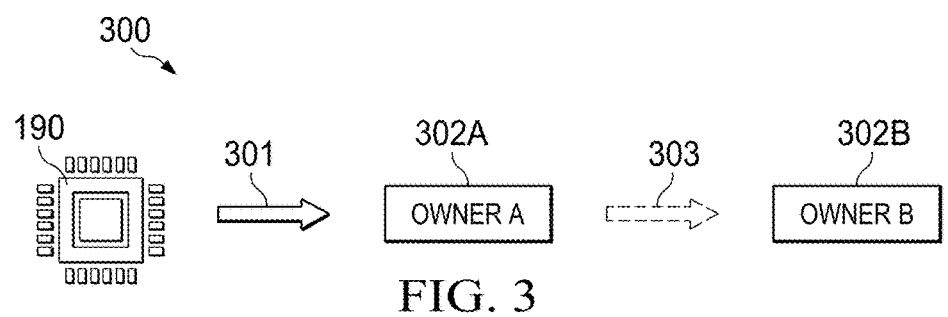
FIG. 3 is a diagram of an example of a unidirectional chain of control of a security processor, chip, or IHS, according to some embodiments.

FIG. 3 is a diagram of an example of a unidirectional chain of control 300 of security processor 190, chip 200, and/or IHS 100, according to some embodiments. In chain 300, security processor 190 may be manufactured and customized by a chip manufacturer and transported in operation 301 to first owner 302A. Once security processor 190 reaches first owner 302A, it stays under control of that entity until first owner 302A transfers security processor 190 to second owner 302B in transaction 303. As part of transaction 303 first owner 302A revokes its ability to control security processor 190 in favor of second owner 302B, including the ability to execute code stored therein, so that only one entity at a time, typically the entity with possession of security processor 190, has control over its firmware, encryptions keys, certificates, etc.

In some cases, first owner 302A may be an Original Equipment Manufacturer (OEM) or IHS manufacturer. In some cases, first owner 302A may be a manufacturer of a printed circuit board assembly (PCBA) or motherboard of the IHS, where the manufacturer has purchased a security chip and installed it on the PCBA. Second owner 302B may be a customer of the OEM entity, or a business, brand or technical group within the OEM entity. In some scenarios, first owner 302A may manufacture and provision an IHS specifically for second owner 302B according to provided specifications.

Here it should be noted that unidirectional chain of control 300 presents several challenges to the OEM's supply chain, such as when first owner 302A is committed to accepting product returns (e.g., followed by repurposing of IHS 100), warranty claims, and/or service calls from second owner 302B. Specifically, in chain of control 300, first owner 302A must rely upon second owner 302B putting first owner 302A back in control of security processor 190 prior to physically shipping IHS 100 to owner 302A, which may not always happen.

Figure 4:
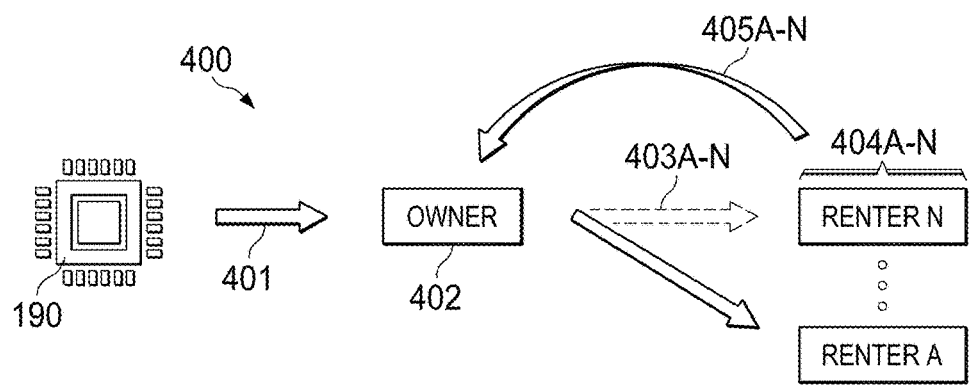
FIG. 4 is a diagram of an example of a bidirectional chain of control of a security processor, chip, or IHS, according to some embodiments.

In contrast with unidirectional chain of control 300, FIG. 4 is a diagram of an example of bidirectional chain of control 400 of security processor 190, chip 200, or IHS 100, according to some embodiments. Particularly, security processor 190 may be customized by a chip manufacturer and transported in operation 401 to owner 402 (e.g., an OEM). Once security processor 190 reaches owner 402, it stays under control of owner 402 until it transfers security processor 190 to renter 404A (e.g., a customer or brand of the OEM) in connection with transaction 403A (e.g., a sale, license, lease, assignment, etc.).

After transaction 403A, however, owner 402 may continue to maintain some restricted form of access to security processor 190, in a manner that reduces or minimizes the potential exposure to renters 404A-N, for example, in the event that owner 402's keys leak while security processor 190 is in the possession of renters 404A-N. As such, when renter 404A returns security processor 190 to owner 402, even in cases where renter 404A does not put owner 402 back in control of security processor 190 prior to shipping IHS 100 to owner 402 in transaction 405A, owner 402 may still exercise some restricted form of control over security processor 190 (e.g., with access to fuse controller but without access to USB, storage, network controllers, etc.) sufficient to evict previous renter 404A's code and to eventually install new renter 404B (e.g., another customer of the OEM entity, etc.) firmware in security processor 190 prior to shipping IHS 100 in transaction 403B.

Figure 5:
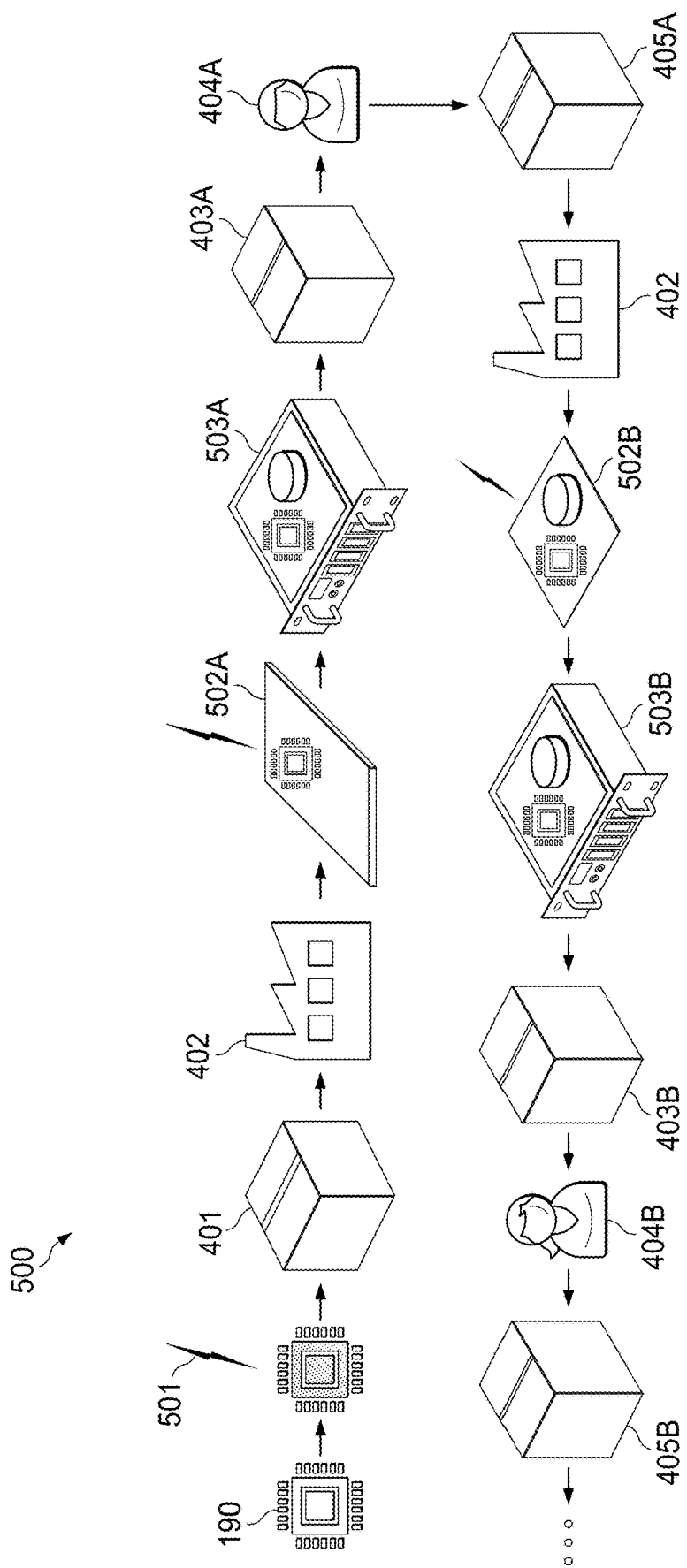
FIG. 5 is a diagram of examples of various supply chain operations involved in the lifecycle of a security processor, chip, or IHS, according to some embodiments.

FIG. 5 is a diagram illustrating examples of various supply chain operations 500 involved in the management of control of security processor 190, chip 200, and/or IHS 100, according to some embodiments. Specifically, security processor 190 may be provisioned 501 for owner 402 (e.g., OEM entity, or manufacturer of IHS 100 factory) by a chip manufacturer and shipped 401 to owner 402. In 502A, owner 402 uses its restricted control over security processor 190 (e.g., whereby access to USB, network, and storage controllers may be excluded) to fuse one or more keys or the like therein, and/or to store code therein that belongs to renter 404A.

In 503A, IHS 100 is assembled, provisioned and tested by owner 402, and then shipped 403A to renter 404A. As described with regard to the below embodiments, factory provisioning of the IHS 100 may include operations by a security processor of the IHS that generate cryptographic certificates that validate the identity of the motherboard installed in IHS 100 and that validate the chassis from which IHS 100 was assembled. Once owner 402 transfers possession of the IHS 100 to renter 404A, boot code instructions, that may be provided by the renter, are used to validate the authenticity of the motherboard and chassis as being the same motherboard and chassis from which IHS 100 was manufactured and delivered to renter 404A.

In some scenarios, renter 404A returns 405A IHS 100 to owner 402, for example, in connection with a return, warranty claim, or service request. In 502B, owner 402 evicts renter 404A from security processor 190, for example, by incrementing the value(s) one of one or more irreversible pointers or counters (e.g., 718A and 718B in FIG. 7) within security processor 190, where these counters specify the boot code and encryption keys that will be used by security processor, thus providing a subsequent renter 404B with exclusive control over security processor 190. In 503B, IHS 100 is updated, re-assembled, provisioned and tested by owner 402. In provisioning IHS 100For instance, owner 402 may use its restricted control over security processor 190 to fuse one or more keys or the like and/or to store code therein that belongs to another renter 404B. IHS 100 is shipped 403B to renter 404B, who may also eventually return 405B IHS 100 to owner 402, and so on.

Figure 6:
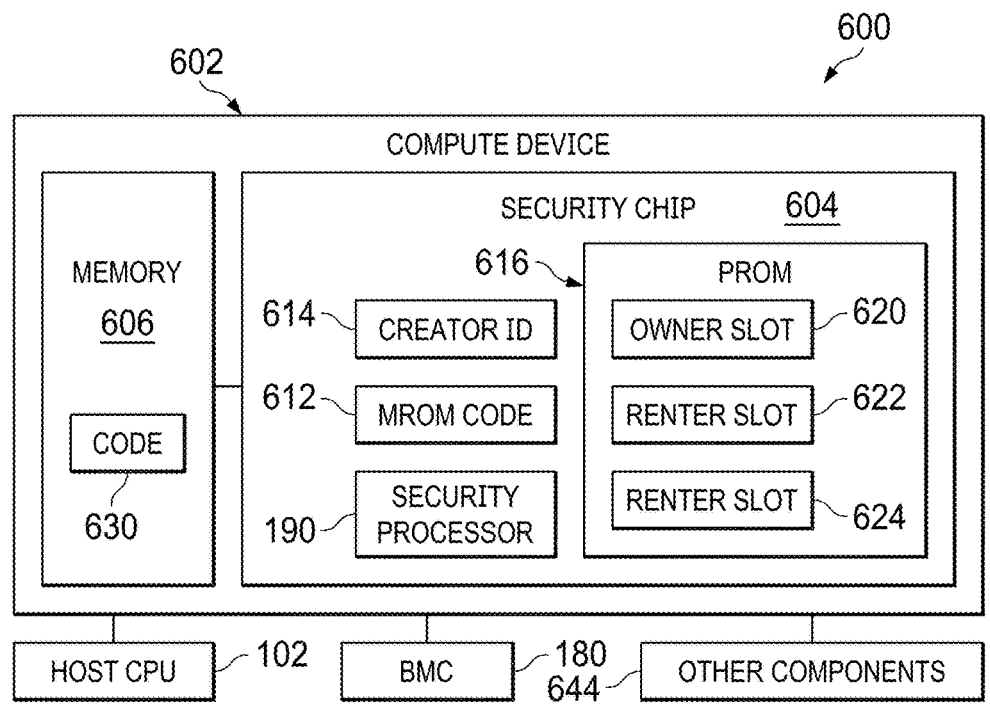
FIG. 6 is a diagram of an example of a compute device, according to some embodiments.

FIG. 6 is a diagram of an example of a portion of compute device 602 of IHS 600, according to some embodiments. IHS 600 may be any suitable system, such as IHS 100 of FIG. 1. Compute device 602 includes security chip 604 (e.g., chip 200) and memory 606. In an example, security chip 604 may be a System-on-a-Chip (SoC). In other examples, however, security chip 604 may be any suitable security chip with a processor or controller 190 and customizable instructions.

As illustrated, security chip 604 may include security processor 190, Mask Read-Only Memory (MROM) code 612, security chip creator ID 614, and Programmable Read-Only Memory (PROM) 614. In an example, PROM 616 includes one-time programmable memory locations or slots to store any suitable data associated with security chip 604. Memory 606 may be any suitable type of flash memory including, but not limited to, an electronically erasable programable read-only memory.

Memory 606 may be utilized to store one or more sets of code 630 that may be retrieved and executed by security processor 190, where this code may include owner boot code or renter boot code. Code 630 may be stored in any suitable location including, but not limited to, memory 606. Code 630 may be written in memory 606 in any suitable manner including, but not limited to, through the use of add-on chip that interfaces with security chip 604 and writes code 630 into the memory 606.

Other components 644 may include any suitable components of compute device 602 including, but not limited to, a Graphics Processing Unit (GPU), a host bus adaptor, a cryptography offload device, a power supply unit, and a network interface card.

In some embodiments of the systems and methods described herein, compute device 602, via security chip 604, may perform any suitable operation including, but not limited to, the operations disclosed herein. In other embodiments, compute device 602 may include additional components without varying from the scope of this disclosure.

A particular chip manufacturer or silicon creator may build security chip 604, such as an SoC. During the manufacturing process of security chip 604, the chip manufacturer or creator may program, write, burn, or otherwise permanently store data (e.g., MROM code 612) within PROM 616. MROM code 612 may be created during the manufacturing of security chip 604 by the chip manufacturer hardwiring the code within the silicon of security chip 604, such that the MROM code may not be changed after being written or programmed. The security chip manufacturer may also store or burn creator identification (ID) 614 within the silicon of security chip 604. Creator ID 614 may be utilized by a customer of the security chip manufacturer (e.g., an IHS manufacturer) to verify that security chip 604 is authentic.

In some embodiments, based on creator ID 614, the security chip manufacturer or an IHS manufacturer may store an owner ID within owner slot 620 of the PROM 616 of the security chip 6044. In an example, the owner ID stored within owner slot 620 during manufacture and provisioning may be a secure boot public key for use in authenticating boot to authentic code 630 within memory 606 of IHS 600.

Additional data may be stored within owner slot 620 including, such as, for example, a group of keys, and an identity of an entity associated with the group of keys. The group of keys may include any suitable keys including, but not limited to, a hidden root key (HRK), a secure boot public key, and identity keys. An HRK may be a fused symmetric key utilized for local encryption and decryption by encrypting/decrypting data on security chip 604. Secure boot public keys and identity keys may be utilized to sign code and sign-proof-of-identity challenges.

The term "secure boot," as used herein, refers to capabilities developed to assure that an IHS boots using only trusted software. "Booting" refers to a chain of events that starts with execution of hardware-based procedures and then hands-off to firmware and software loaded into a memory, and it may involve processes such as one or more of: self-tests, the loading of configuration settings, and/or the loading of one or more of a BIOS, a hypervisor, an OS, or the like.

In various supported secure boot modes, once IHS 100 starts, security processor 190 checks the signature of each piece of boot software, including UEFI firmware drivers (also known as Option ROMs), EFI applications, and OS. If the signatures are valid, IHS 100 boots, and security processor 190 gives a selected amount of control, commensurate with the type of secure boot (e.g., by type of controlling entity, owner 402 or renter 404A-N). The OEM may use instructions from the firmware manufacturer (e.g., customer or brand) to create secure boot public keys and to store them in security processor 190.

Code 630 may be as associated with an owner entity and may enable the owner entity to assign particular rights or privileges within compute device 602, such as with respect to security chip 604 and security processor 190. In an example, the entity associated with the owner ID within owner slot 620 may be any suitable entity including, but not limited to, a printed circuit board assembly (PCBA), and a PCBA factory of a company that purchases security chip 604 from the manufacturer of the security chip.

Code 630 may be stored in any suitable location including, but not limited to, memory 606. In an example, code 630 may be written in memory 606 may any suitable manner including, but not limited to, an add-on chip mounted above the security chip 604 and the add-on chip may write the code directly into the memory.

Security chip 604 may utilize the group of keys within owner slot 620 to authenticate code 630 associated with the owner entity. Upon code 630 being authenticated, the owner entity may execute the code to perform any suitable operations including, but not limited to, verifying other devices in IHS 600 that are directly attached to security chip 604 including, but not limited to, host CPU 102, BMC 180, and other components 244.

In previous IHSs, owner slot 620 would be invalidated when ownership was transferred to another entity. However, these actions may reduce the ability of end users/customers to have total control of firmware, identity, and keys without compromising supply-chain assurances for mainstream products of the IHS manufacturer. For example, in previous IHSs, a different SoC or motherboard with a different security or RoT chip would need to be manufactured for different products of the IHS manufacturer.

Compute device 602 may improve IHS 200 by enabling a single security chip, such as security chip 604, to be produced. This single security chip may be utilized across multiple business lines of the IHS manufacturer, and include different firmware, identity and keys based on the business line or entity utilizing the security chip.

In an example, owner slot 620 is protected so that this slot of PROM 616 may not be invalidated. Code 630 associated with the entity of owner slot 620 may be able to create and remove one or more renter entities of security chip 604 by fusing and invalidating one or more additional slots within PROM 616, such as renter slots 622 and 624. The operations of creating and invalidating different renter entities are described below with respect to FIGS. 7-9.

Figure 7:
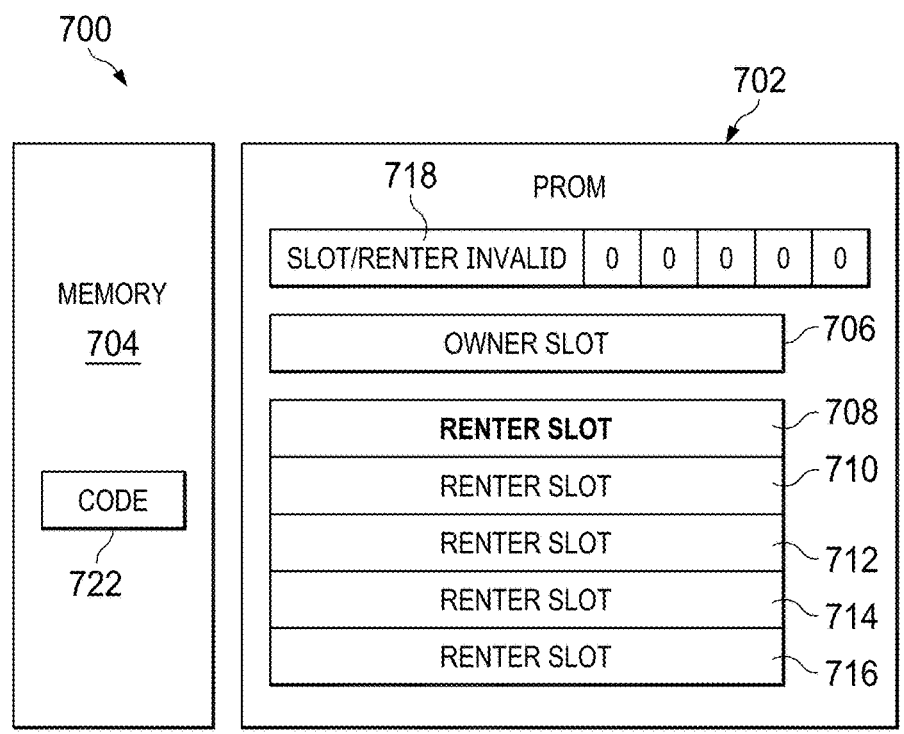
FIGS. 7-9 are diagrams of examples of storage locations within a programmable read only memory of a compute device, according to some embodiments.
Figure 8:
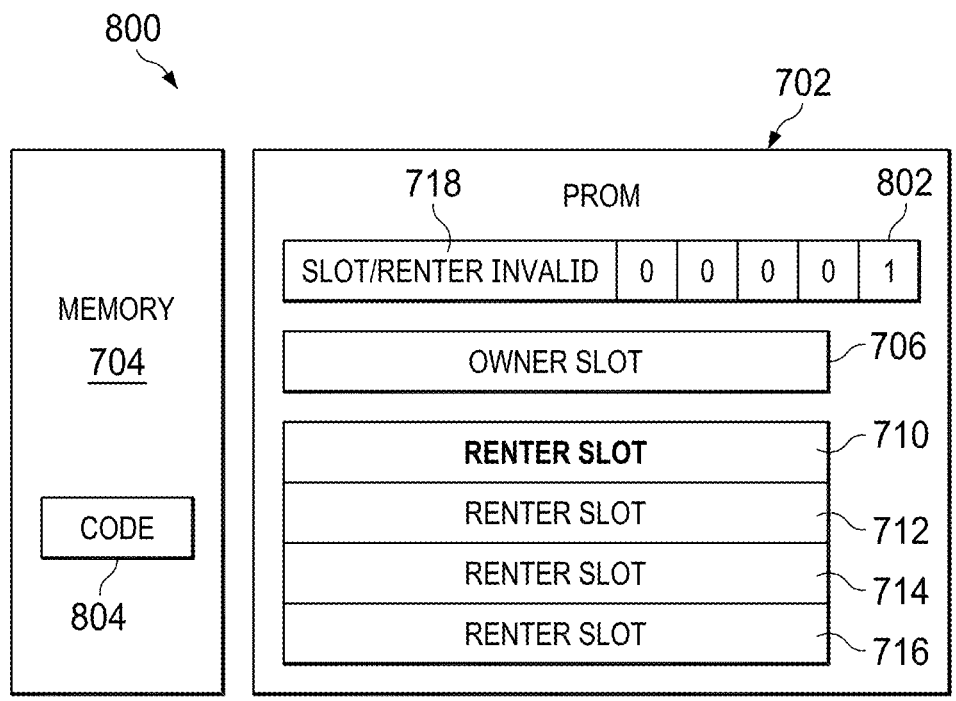
Figure 9:
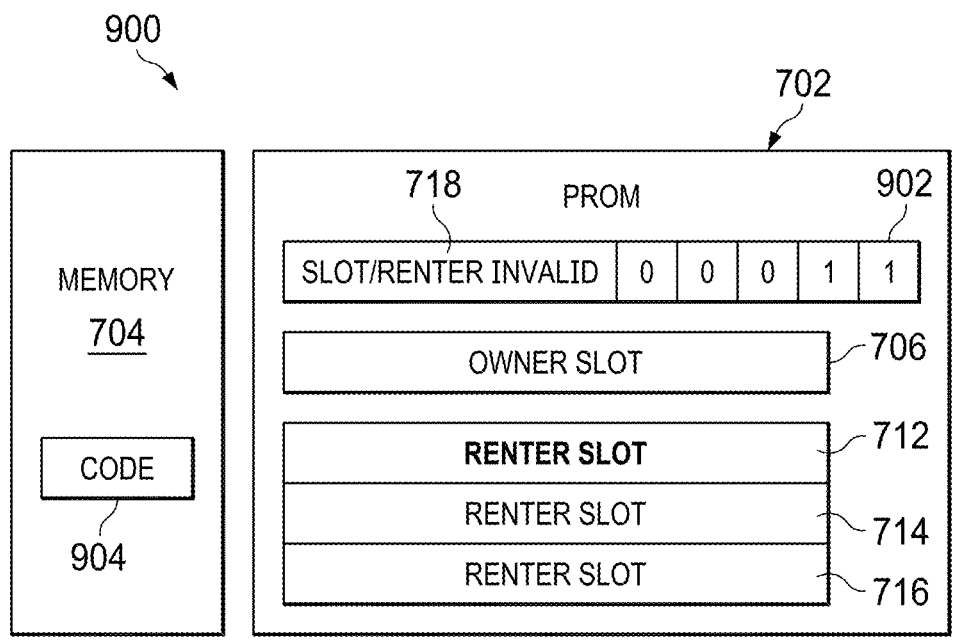

FIGS. 7-9 are diagrams of examples of storage locations of a compute device, according to some embodiments. Particularly, compute device 700 includes PROM 702 and memory 704. In an example, PROM 702 includes multiple one-time programmable memory slots. In some cases, PROM 702 may be substantially similar to PROM 616 on security chip 604 of compute device 202 in FIG. 2.

PROM 702 an owner slot 706, renter slots 708, 710, 712, 714, 716 (708-716), and slot/renter invalid counter 718. In an example, each of owner slot 706 and renter slots 708-716 may be one-time programmable slots of PROM 702. PROM 702 may include additional storage locations without varying from the scope of this disclosure. For instance, PROM 702 may include additional renter slots, and the number of renter slots may be limited only based on the size of PROM 702.

Slot/renter invalid counter 718 may be a counter that is only able to count in one direction. For example, each entry within slot/renter invalid counter 718 may be one-time programmable entries that cannot be erased, such that the slot/renter invalid counter may be incremented by a next in order entry being set. In other examples, compute device 700 may include additional components over those illustrated in FIG. 3 without varying from the scope of this disclosure.

During manufacturing of a security chip, such as security chip 604 of FIG. 6, data may be fused or one-time programmed in owner slot 706. In an example, the data fused in owner slot 706 may include, but is not limited to, one or more secure boot public keys, identity keys, and a HRK. The secure boot public keys in owner slot 706 may be utilized to validate code associated with an entity identified within owner slot 706. In an example, the code validated by the secure boot public keys within owner slot 706 may be code 720 within memory 704. In certain examples, the code associated with the entity of owner slot 706 may include instructions for fusing and invalidating renter slots 708-716 such as, for example:

```
If (Vacancy) {
//make SoC useless, owner only
//should program renter slots
disable_everything_but_slots( );
SecureBoot(OWNERSLOT)
} else {
lock_fuses( );
SecureBoot(& selectedRenter);
}
```

In the code above, vacancy may be defined as no valid key having been found in any of renter slots 708-716, such that the silicon-rooted trust of the security chip is passed back to owner slot 706 or ownership of the security chip has never been transferred to a renter. In an example, a "valid key"= (non zero && !slotinvalid), where "non zero" refers to owner controls and "!slotinvalid" refers to renter controls.

When code 720 associated with owner slot 706 is executed, data for a renter entity may be fused in renter slot 708 (as illustrated by the label for renter slot 708 being 'bolded' in FIG. 7). When renter slot 708 is fused with data, new code, such as code 722 associated with the renter entity of renter slot 708, may replace code 720 within memory 704. In an example, the replacement of code 720 with code 722 is illustrated by code 720 having an 'X' over it in FIG. 3.

The data fused in renter slot 708 may include, but is not limited to, a group of keys, such as one or more secure boot public keys, identity keys for the renter entity, and an HRK. In an example, the group of keys in renter slot 708 may include a silicon-root trust key to validate code 722 associated with the renter entity of renter slot 708. Secure boot public keys in renter slot 708 enable the renter entity associated with the renter slot execute code 722 in a processor, such as security processor 190. In certain examples, code 722 may enable security processor 190 of security chip 604 to perform one or more secure boot operations of IHS 100.

In various implementations, privileges granted to the owner entity and each renter entity may be exclusive to the owner and renter. For example, the owner entity associated with owner slot 706 may only be able to execute code 720 based on the group of keys in owner slot 706 only being able to validate code 720. In an example, in response to code 720 being validated the owner entity associated with owner slot 706 may have write access to fuse a group of keys for silicon rooted-trust within each of the one-time programmable slots, such as renter slots 708-716. The owner entity may also have write access to slot/renter invalid counter 718 to invalidate particular renter slots 708-716 and thereby remove privileges of the associated renter entity.

In response to a group of keys within a particular renter slot, such as renter slot 708, validating code 722, the associated renter entity may be granted particular renter privileges.

Privileges of the renter entities may include read and write access to all peripherals of a compute device, such as other CPU 102, BMC 180, and other components 244 of compute device 602 within IHS 100. Additionally, code 722 may enable a renter entity associated with renter slot 708 remove their own privileges and invalidate the group of keys within renter slot 708. However, renter entities are not able to fuse data in other renter slots.

A division of privileges between the owner entity and the renter entities enable an access-control mechanism for each entity. For example, if a renter entity is compromised, the owner entity may not be affected because so long as the renter entity does not have access to the fuse controller of security processor 190. Conversely, if the owner entity is compromised, the current renter entity may not be affected because the owner entity does not have access to other controllers (e.g., USB, network, storage, etc.). In some cases, more than two different types of access may be provided for different entities having concurrent access to security processor 190.

Referring now to FIG. 8, one or more suitable operations may be performed to invalidate renter slot 708. In an example, the invalidation of the group of keys within renter slot 708 may be performed by the owner entity or the renter entity. Renter slot 708 may be invalidated for any suitable reason including, but not limited to, the renter entity needed to be remanufactured, and the renter entity needed to be decommissioned. The renter entity or owner entity may invalidate renter slot 708 to prevent the renter entity to boot code 722, verify the renter entity identity, and encrypt or decrypt data using the HRK within renter slot 708.

In certain examples, a processor executing code 722 associated with a renter entity of renter slot 708 may perform one or more operations to invalidate the renter slot. For example, the processor may execute software to directly invalidate the group of keys in in the one-time programmable slot associated with the renter entity. In an example, the processor may directly invalidate the group of keys in the one-time programmable slot 708 by incrementing slot counter 718. Each time slot counter 718 is updated, a current valid renter slot of the one-time programmable slots 708-716 is invalidated.

The renter entity associated with renter slot 708 may want to invalidate the group of keys within renter slot 708 prior to returning the security chip to the owner entity. In this example, the renter entity may invalidate of the group of keys within renter slot 708 so that the owner entity may not be able to validate code 722. If renter slot 708 is not invalidated prior to the security chip being returned to the owner entity associated with owner slot 706, the owner entity associated with owner slot 706 may invalidate the group of keys within renter slot 708.

Renter slot 708 may be invalidated by incrementing slot counter 718 by any suitable manner, such incrementing entry 802. Renter slot 708 is shown in FIG. 7 as being invalidated by the label renter slot 708 being struck through. In an example, each entry of slot/renter invalid counter 718 may be associated with a different one or renter slots 708-716. In this example, performing a one-time program to increment a particular entry may invalidate the associated renter slot. In an example, none of the entries within slot/renter invalid counter 718 are associated with owner slot 706. Owner slot 706 may not be able to be invalidated, such that whenever code 720 is written in memory 704 the group of keys within owner slot 706 may be utilized to validate code 720.

After renter slot 708 is invalidated, the owner entity associated with owner slot 706 may determine whether another entity is able to rent or be provided temporary silicon-rooted trust of a security chip, such as security chip 604 of FIG. 6. In an example, when code 720 associated with owner entity is stored in memory 704 and validated by the group of keys in owner slot 706 is executed, data for the new renter entity may be fused in renter slot 710 (as illustrated by the label for renter slot 710 being 'bolded' in FIG. 8).

The data fused in renter slot 710 may include, but is not limited to, a group of keys, such as one or more secure boot public keys, identity keys for the renter entity, and an HRK for the renter entity. When renter slot 710 is fused with data, code 804 associated with the renter entity of renter slot 710 may be stored within memory 704. In an example, the group of keys in renter slot 710 may be the silicon-root trust key to validate code 804, when a compute device is booted. The secure boot public keys enable the renter entity associated with renter slot 710 to execute code 804.

Referring now to FIG. 9, one or more suitable operations may be performed to invalidate renter slot 710. As described above, the invalidation of renter slot 710 may be performed by the owner entity or the renter entity. Renter slot 710 may be invalidated by incrementing invalid counter 718 via writing a value to entry 902. Renter slot 710 is shown in FIG. 9 as being invalidated by the label renter slot 710 being struck through. In an example, performing a one-time program write to entry 902 may invalidate renter slot 710.

After renter slot 710 is invalidated, owner entity may determine whether another entity is able to rent or be provided temporary silicon-rooted trust of a security chip, such as security chip 604 in FIG. 6. In an example, when code 720 associated with owner slot 706 is stored in memory 704 and executed, data for the new renter entity may be fused in renter slot 712 (as illustrated by the label for renter slot 712 being 'bolded' in FIG. 9).

The data fused in renter slot 712 may include, but is not limited to, a group of keys, such as one or more secure boot public keys, identity keys of the renter entity, and an HRK for the renter entity. When renter slot 712 is fused with data, code 904 associated with the renter entity of renter slot 712 may be stored within memory 704. In an example, the secure boot public keys in renter slot 712 may be the silicon-root trust key to validate code 904, when a compute device is booted. The secure boot public keys enable the renter entity associated with renter slot 710 to execute code 904.

In an example, if the new renter entity associated with renter slot 712 is the same entity as a previous renter entity, such as the renter entity associated with renter slot 708, the data in the new renter slot may be different than the data stored in the previous renter slot. For example, the group of keys, such as the identification keys of the renter entity and the HRK for the renter entity, may be different within the new renter slot.

The number of renter entities that may utilize security chip 204 may be dictated based on space within PROM 216. In some implementations, this restriction may be mitigated or reduced by using a combination of one-time programmable memory space and of non-volatile storage.

Figure 10:
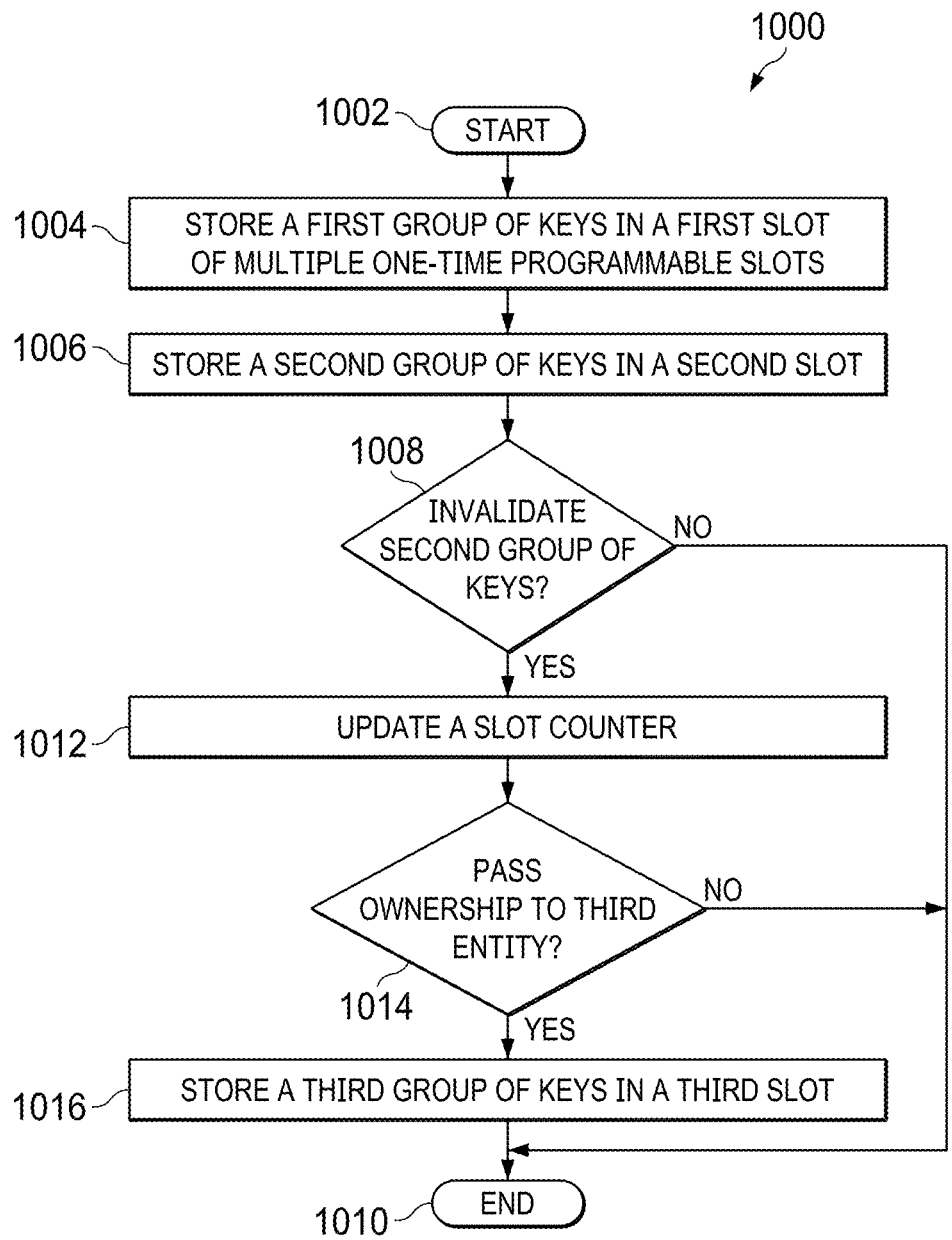
FIG. 10 is a flowchart of an example of a method for supporting multiple independent silicon-rooted trusts for a a security processor, chip, or IHS, according to some embodiments.

FIG. 10 is a flowchart of an example of method 1000 for supporting multiple independent silicon-rooted trusts for security processor 190, chip 200, or IHS 100, according to some embodiments, starting at block 1002. FIG. 10 may be employed in whole, or in part, by IHS 100 depicted in FIG. 1, compute device 602 depicted in FIG. 6, or any other type of system, controller, device, module, processor, or any combination thereof, operable to employ all, or portions of, the method of FIG. 10.

At block 1004, a first group of keys is stored in a first slot of multiple one-time programmable slots. In certain examples, the first group of keys may include any suitable number of keys including, but not limited to, secure boot public keys, HRK, and identity keys. In an example, the secure boot public key may be any suitable key to validate a set of code within a memory of a security chip. The memory may be an EEPROM memory. Upon the first group of keys being written in the first slot, the first group of keys may not be overwritten or erased. In an example, the first group of keys may be associated with code for a first entity. The first entity may be an owner of the security chip, such that the first entity may control what other entities may be granted access privileges to the security chip. The other entities granted access privileges may be referred to as renters of the security chip.

At block 1006, a second group of keys is stored in a second slot of the one-time programmable slots. In an example, the second group of keys may be written to, or fused, within the second slot. The second group of keys may be associated with code for a second entity. In an example, the code associated with the second entity of the second slot may replace previous code in the memory of the security chip. In response to the second group of keys being stored within the second slot, the second entity may become the renter of the security chip, such that the second entity may utilize the group of keys in the second slot to validate the code for the second entity stored in the memory. The second entity may be granted access privileges to the security chip.

At block 1008, a determination is made whether the second group of keys is to be invalidated. In an example, any suitable component may execute code to perform the determination. For example, the first entity or the second entity may determine whether the second secure boot public key is to be invalidated. In certain examples, the second group of keys may be invalidated for any suitable reason including, but not limited to, a security chip of a compute device needing to go through remanufacturing or decommissioning. If the second secure boot public key is not to be invalidated, the flow ends at block 1010.

If the second secure boot public key is to be invalidated, a slot counter is updated at block 1012. In an example, the slot counter may be any suitable counter including, but not limited to, a monotonic one-time programmable counter, such that the slot counter only changes in a single direction. In an example, each entry in the slot counter may be associated with a different slot of the one-time programmable slots. In this example, as the slot counter is updated, individual slots of the one-time programmable slots are invalidated on a one-by-one slot basis. In certain examples, the incrementing of the slot counter may include a one-time write to an entry associated with the second slot, which in turn is associated with the second entity. In certain examples, the second value may be stored in the entry through execution of code associated with either the first entity or the second entity. At block 1014, a determination is made whether ownership of the security chip is to be passed to a third entity. If ownership of the security chip is not to be passed to the third entity, the flow ends at block 1010.

If ownership of the security chip is to be passed to the third entity, a third group of keys is stored in a third slot of the one-time programmable slots of the security chip at block 1016, and the flow ends at block 1010. In certain examples, code associated with the second entity of the second slot may replace previous code in the memory of the security chip. In an example, in response to the third group of keys being stored in the third slot, the third entity may utilize the group of keys in the third slot to validate the code for the third entity stored in the memory. The third entity may be granted access privileges to the security chip and other components of the compute device. While writing of three groups of keys has been described with respect to FIG. 10, method 1000 may be applied for as many one-time programmable slots available within the PROM of the security chip.

FIG. 11 show table 1100 illustrating an example of public keys PK14-0 within security processor 190, chip 200, or IHS 100 that are usable by different entities 1101-1105 to perform different types of secure boot operations, according to some embodiments. Each line of table 1100 identifies a secure boot public key separated in groups 1101-1105, each group of keys belonging exclusively to a distinct entity potentially in control of security processor 190. In some cases, each group of keys 1101-1105 may be associated with different rules of access and/or privilege (e.g., with respect to a fuse controller, an USB controller, a network controller, a storage controller, etc.).

For each secure boot public key, each column of table 1100 indicates whether that key can invalidate any other subordinate key (PK14-0). For example, table 1100 indicates that secure boot public keys PK14-12 are only usable by a first entity 1101 (e.g., an OEM) to revoke and/or invalidate lower-ranking other secure boot public keys PK11-0, including secure boot public keys PK11-9 belonging to a second entity 1102 (e.g., a customer or brand of the OEM), and so on.

Figures 12, 13:
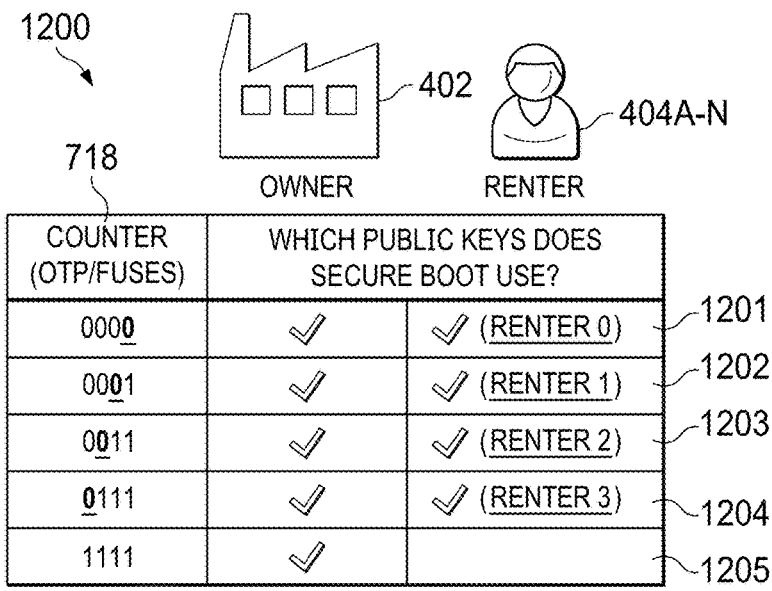
FIG. 12 is a table illustrating an example of a counter configured to facilitate the concurrent use of different secure boot public keys, according to some embodiments.
FIG. 13 is a table illustrating an example of two counters configured to facilitate the mutually exclusive use of different secure boot public keys, according to some embodiments.

To further illustrate aspects of the systems and methods described in FIGS. 7-11, table 1200 in FIG. 12 shows an example of a counter (e.g., 718) configured to facilitate the concurrent use of different secure boot public keys (e.g., PK14-0) by different entities (e.g., 1101-1105), according to some embodiments. Specifically, in line 1201, table 1200 indicates that security processor 190 may use secure boot public keys associated with either owner entity 402 or first renter entity (Renter 0) 404A to perform secure boot operations upon IHS 100 in response to counter 718 having an initial value (0000). Each entity 402 and 404A may only be able to perform a particular type of secure boot process commensurate with its access or privileges.

In line 1202, an incremented counter 718 value (0001) indicates that security processor 190 may only use secure boot public keys associated with owner 402 or second renter entity (Renter 1) 404B to perform secure boot operations upon IHS 100. In line 1203, an again incremented counter 718 value (0011) indicates that security processor 190 may only use secure boot public keys associated with owner 402 or third renter entity (Renter 2) 404C to perform secure boot operations upon IHS 100. In line 1204, a once again incremented counter 718 value (0111) indicates that security processor 190 may only use secure boot public keys associated with owner entity 402 or fourth renter entity (Renter 3) 404N (when N=4) to perform secure boot operations upon IHS 100. In line 1204, a yet again incremented counter 718 value (1111) indicates that security processor 190 may use only secure boot public keys associated with the owner entity to perform secure boot operations upon IHS 100.

As such, using the methods summarized in table 1200, two (or more) different sets of secure boot public keys may be used, potentially concurrently, by different entities, owner 402 and renters 404A-N, to perform different types of secure boot operations, without the need for renter entities to expressly evict themselves, for example, in connection with a return 405A-N of IHS 100 to owner 402.

In contrast with table 1200 of FIG. 12, table 1300 of FIG. 13 illustrates an example of two counters 718A and 718B configured to facilitate the mutually exclusive use of different secure boot public keys by different entities, according to some embodiments. Particularly, in line 1301, table 1300 indicates that security processor 190 may only use secure boot public keys associated with owner 402 to perform secure boot operations upon IHS 100, in response to counters 718A and 718B each having an initial value (0000). In this counter state, a first set of restrictions may be applied to access by owner 402 (e.g., access to fuse controller, but no access to USB, storage, or network controllers).

In line 1302, table 1300 indicates that security processor 190 may only use secure boot public keys associated with first renter (Renter 0) 404A to perform secure boot operations upon IHS 100, to the exclusion of owner 402, in response to owner 402 incrementing first counter 718A (to 0001) and maintaining the value of second counter 718B the same (e.g., prior to shipping 403A). In this counter state, a second set of restrictions may be applied to access by first renter 404-A (e.g., access to USB, storage, or network controllers, but no access to fuse controller). In line 1303, table 1300 indicates that security processor 190 may again only use secure boot public keys associated with owner 402 to perform secure boot operations upon IHS 100 in response to first renter 404-A incrementing second counter 718B (to 0001) and maintaining the value of first counter 718A the same (e.g., prior to return 405A).

In line 1304, table 1300 indicates that security processor 190 may only use secure boot public keys associated with second renter (Renter 1) 404B to perform secure boot operations upon IHS 100 in response to owner 402 incrementing first counter 718A (to 0011) and maintaining second counter 718B the same (e.g., prior to shipping 403B). In line 1305, table 1300 indicates that security processor 190 may again only use secure boot public keys associated with owner 402 to perform secure boot operations upon IHS 100 in response to second renter 404B incrementing second counter 718B (to 0011) and maintaining first counter 718A the same (e.g., prior to return 405B).

In line 1306, table 1300 indicates that security processor 190 may only use secure boot public keys associated with third renter (Renter 2) 404C to perform secure boot operations upon IHS 100 in response to owner 402 incrementing first counter 718A (to 0111) and maintaining second counter 718B the same (e.g., prior to shipping 403C). In line 1307, table 1300 indicates that security processor 190 may only use secure boot public keys associated with owner 402 to perform secure boot operations upon IHS 100 in response to third renter 404C incrementing second counter 718B (to 0111) and maintaining first counter 718A the same (e.g., prior to return 405C).

In line 1307, table 1300 indicates that security processor 190 may only use secure boot public keys associated with fourth renter (Renter 3) 404N (e.g., when N=4) to perform secure boot operations upon IHS 100 in response to owner 402 incrementing first counter 718A (to 1111) and maintaining second counter 718B the same (e.g., prior to shipping 403C). In line 1308, table 1300 indicates that security processor 190 may only use secure boot public keys associated with a return merchandise authorization (RMA) entity or the like, thus optionally ending the lifecycle of security processor 190.

In the example of table 1300, two different types of secure boot are provided, "owner" and "renter." In some cases, a first type of secure boot by an owner may invoke secure boot privileges or restrictions such as, for example: access to limited set of peripherals or controllers (e.g., enough for provisioning, but not enough to make BMC 180 fully operational), write access to a one-time programmable (OTP) memory for fusing (e.g., fusing "silicon rooted-trust", and addition of new renters, customers, or brands), and revocation of any installed renter, customer, or brand. Meanwhile, a second type of secure boot by a renter may invoke secure boot privileges or restrictions such as, for example: access to all peripherals or controllers except for fusing (e.g., enough to make BMC 180 fully operational), and revocation of itself via fusing (i.e., incrementing counter 718B, RMA, etc.)

Although table 1300 illustrates only two types of secure boot, it should be noted that any other number of different types of secure boot may be used, each type with different privileges depending upon an associated entity's position in a supply chain. For example, in some embodiments a "silicon creator" may be able to execute a first type of secure boot with only the ability to perform initial silicon provisioning and testing, and faulty silicon RMA. A "board vendor" may be able to execute a second type of secure boot with only the ability to perform a one-time factory software and/or normal runtime customer software operations. Meanwhile, an "OEM entity" may be able to execute a third type of secure boot with only the ability to perform OEM-unique software operations.

As such, systems and methods described herein may provide mutually exclusive, but concurrently resident secure boot models and/or public keys inside a single SoC. Moreover, new types of secure boot models may be introduced. For example, a renter may require that a special firmware/provisioning process occur at "first touch" only, prior to a customer of the renter's deploying IHS 100 at their own customer site. For each type of secure boot model, revocation and key rotations may be kept independent from each other.

Still referring to table 1300 of FIG. 13, because the use of different secure boot public keys by different entities is mutually exclusive, these techniques may alleviate potential security concerns by renters 404A-N (e.g., when owner keys are exposed) in the supply chain (in comparison with table 1200 of FIG. 12). If renter 404A-N returns IHS 100 to owner 402 without having evicted itself from security processor 190 (e.g., by incrementing second counter 817B), however, owner 402 does not have a way to access the fuse controller of security processor 190 on its own, because the owner's keys will still be rendered inaccessible and/or revoked. (In those cases, for owner 402 to evict a given renter 404A-N, owner 402 would have to run that renter's firmware to self-evict.)

Accordingly, to address the self-eviction concerns associated with table 1300 of FIG. 13, systems and methods described herein also provide for automated eviction or previous owners under certain conditions. First, security processor 190 may check fuses and/or registers to identify a secure boot public key or set of keys, owned by or assigned to a first entity, last used by that first entity to bootstrap IHS 100, and it may determine that the last used secure boot public key now fails to initiate a secure boot process.

Upon failure to initiate the secure boot process, security processor 190 may attempt to use another secure boot public key (owned by or assigned to a second entity) to bootstrap the IHS. If the boot succeeds or initiates, and if security processor 190 is determined to be in an authorized factory environment, then security processor 190 may increment pointers and/or counters 718A and/or 718B to reflect the change in control of security processor 190, without user intervention, thus creating a "one-way trap door." In some implementations, to determine that it is in a factory environment, security processor 190 may use a general-purpose input/output (GPIO) digital signal pin reading, a secure component verification or cryptography method, a certificate chain evidencing presence in a factory, etc.

An example of a first set of instructions executable by security processor 190 to effect a renter's 404A-N eviction when security processor 190 reaches owner 402, but that renter did not self-evict prior to shipping IHS 100:

---
If (value of Counter 718B <= value of counter 718A) {
   if(Renter_Secure_Boot( ) == FAIL)
     if(Test_Owner_Secure_Boot( ) == SUCCESS)
       If(Test_In_Factory_Environment( ) == "Yes")
         Counter 718B++;
         reset( );

---

Conversely, an example of a second set of instructions executable by security processor 190 to effect an owner 402's eviction when security processor 190 reaches renter's 404A-N, but owner 402 did not self-evict prior to shipping IHS 100:

---
If (value of Counter 718 A <= value of counter 718B) {
   if(Owner_Secure_Boot( ) == FAIL)
     if(Test_Renter_Secure_Boot( ) == SUCCESS)
       If(Test_In_Factory_Environment( ) == "Yes")
         Counter 718A++;
         reset( );

---

Figure 14:
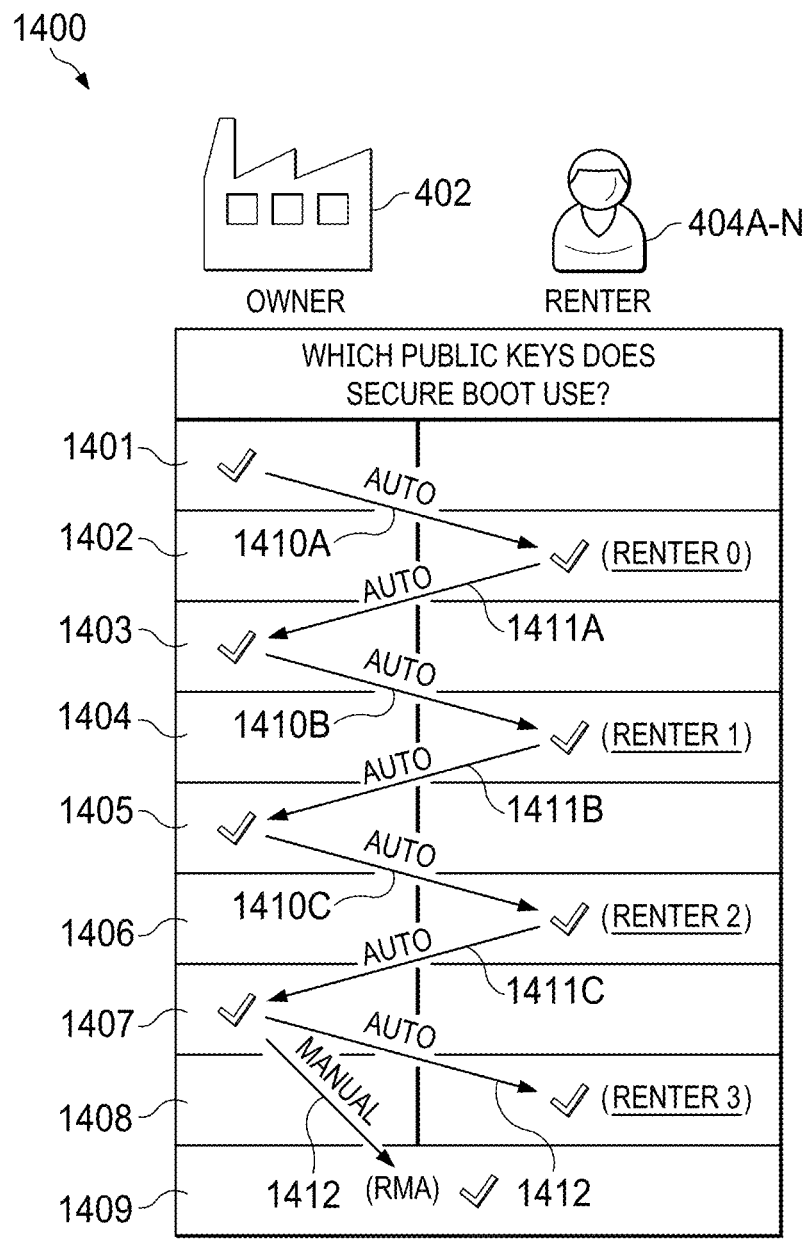
FIG. 14 is a table of an example of a method for automatically evicting an entity previously in control of a security processor, chip, or IHS, according to some embodiments.

To illustrate this, FIG. 14 shows an example of method 1400 for automatically evicting an entity (402 or 404A-N) previously in control of security processor 190, chip 200, or IHS 100. In line 1401, security processor 190 is first under control of owner 402 when it is shipped to a first renter (Renter 0) (e.g., 404A) without owner 402 having self-evicted. Upon first execution 1410A of the second set of instructions, owner 402 is successfully evicted by the first renter (e.g., 404A) in a verified factory environment (e.g., lab, IT facilities, etc.), and the first renter obtains control of its own secure boot public keys. In line 1402, security processor 190 remains under control of the first renter (e.g., 404A) until IHS 100 is returned to owner 402 without the first renter having self-evicted. Upon first execution 1411A of the first set of instructions above, the first renter (e.g., 404A) is successfully evicted by owner 402 in a verified factory environment, and owner 402 obtains control of its own secure boot public keys. In line 1403, security processor 190 remains under control of owner 402 until IHS 100 is shipped to a second renter (Renter 1) (e.g., 404B) without owner 402 having self-evicted.

Upon second execution 1410B of the second set of instructions, owner 402 is successfully evicted by the second renter (e.g., 404B) in a verified factory environment, and the second renter obtains control of its own secure boot public keys. In line 1404, security processor 190 remains under control of the second renter (e.g., 404B) until IHS 100 is returned to owner 402 without the second renter having self-evicted. Upon second execution 1411B of the first set of instructions, the second renter (e.g., 404B) is successfully evicted by owner 402 in a verified factory environment, and owner 402 obtains control of its own secure boot public keys. In line 1405, security processor 190 remains under control of owner 402 until IHS 100 is shipped to a third renter (Renter 2) (e.g., 404C) without owner 402 having self-evicted.

Upon third execution 1410C of the second set of instructions, owner 402 is successfully evicted by the third renter (e.g., 404C) in a verified factory environment, and the third renter obtains control of its own secure boot public keys. In line 1406, security processor 190 remains under control of the third renter (e.g., 404C) until IHS 100 is returned to owner 402 without the third renter having self-evicted. Upon third execution 1411C of the first set of instructions, the third renter (e.g., 404B) is successfully evicted by owner 402 in a verified factory environment, and owner 402 obtains control of its own secure boot public keys. In line 1407, security processor 190 remains under control of owner 402 until IHS 100 is shipped to a fourth renter (Renter 3) (e.g., 404N) without owner 402 having self-evicted, and/or until IHS 100 is manually assigned to an RMA unit or the like.

As such, the eviction methods of table 1400 may change the assumptions or expectations of MROM 202 by enabling the automatic eviction of a renter when security processor 190 is in the owner's facility, and/or to enable the automatic eviction of the owner, when security processor 190 is in a renter's facility. These eviction methods may also provide dynamic detection of verifiable code installed, and verifiable presence of the system in a factory or the like, without negative impact to key management best practices (e.g., forced revocation, forced reuse of unrelated key, etc.).

In some embodiments, once security processor 190 starts up, it may initiate a secure boot of the CPU 102 and/or BMC 180, and each of these different processors may be coupled to any number endpoint peripherals, devices, or controllers (e.g., USB controllers, storage controller, power supply controllers, network controllers, etc.). As security processor 190 processor itself can be rented out, MROM 202 must provide the immutable source of truth, for example, when it comes to actions taken by IT personnel. Moreover, it is likely that one or more peripherals or devices may be interested in the type of secure boot last used, which is the original RoT for IHS 100. For example, a storage controller may only allow injection of secret keys when an OEM's code is running; that is, once the controller can verify that the last type of secure boot used was an owner's.

Figure 15:
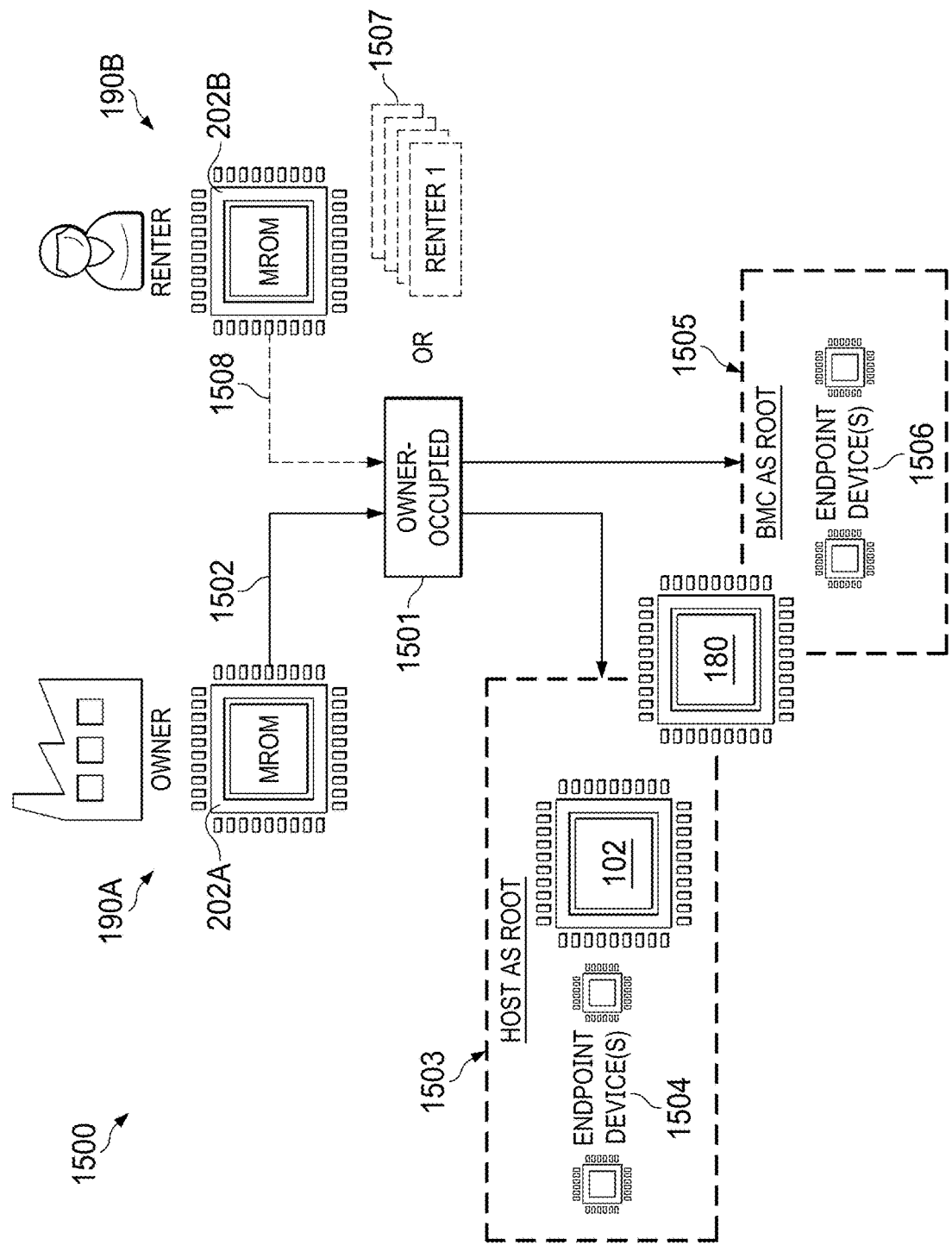
FIG. 15 is a diagram of an example of a method for conveying a type of secure boot process to endpoint peripherals or devices, according to some embodiments.

To address these and other needs, FIG. 15 is a diagram of an example of method 1500 for conveying a type of secure boot process to endpoint peripherals or devices 1504 and/or 1506, according to some embodiments. In method 1500, MROM 202 may be executed as 202A by processor 190 in owner mode 190A. Conversely, MROM 202 may be executed as 202B by processor 190 in renter mode 190B.

In this scenario, owner-type of secure boot process 1502 results in owner-occupied state 1501, whereas renter-type of secure boot process 1508 would result in renter-occupied state(s) 1507. In either case, security processor 190 may publish or otherwise may available to both host 102 and BMC 180 domains 1503 and 1505, respectively, a read-only register which indicates the type of secure boot last used to bootstrap IHS 100 (e.g., owner or renter), along with other information (e.g., a number of times security processor 190 has been shipped to different customers or brands 404A-N, a number of times security processor 190 has been returned to an OEM 402, or a number of times the security processor has been reprovisioned, available to host CPU 102 or BMC 180), such that endpoint devices 1504 and 1506 in each respective domain 1503 and 1505, respectively, is able to discover which operations MROM 202 has performed.

In various embodiments, signifying the "type of" secure boot downstream (to PCI devices, internal memories, etc.) may create an immutable source of trust for all endpoint devices, regardless of whether the endpoint device is connected to CPU 102 or BMC 180. This feature may be useful, for example, when endpoint detection of owner code running (e.g., IHS 100 is in a "factory provisioning mode") is needed early on in their own boot (e.g., an endpoint's "bootloader," factory provisioning of keys, etc.). Moreover, systems and methods described herein may provide a secure solution, without the complexities involved with requiring extra keys or seeds, to perform a robust proof of trustworthiness on behalf of endpoint devices that tend to get be simpler and have more limited processing capabilities downstream.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A security processor, comprising:
a core; and
a memory coupled to the core, the memory having program instructions stored thereon that, upon execution by the core, cause the security processor to:
store a first public key usable to initiate a first secure boot process and unusable to initiate a second secure boot process, wherein the first secure boot process excludes access to a first set of one or more selected controllers, and wherein the second secure boot process excludes access to a second set of one or more selected controllers;
store a second public key usable to initiate the second secure boot process and unusable to initiate the first secure boot process; and
in response to a first change of control or ownership of the security processor, render the first public key unusable to initiate the first secure boot process.

2. The security processor of claim 1, wherein the first set of one or more selected controllers comprises a fuse controller, and wherein the second set of one or more selected controllers excludes the fuse controller.

3. The security processor of claim 2, wherein the second set of one or more controllers comprises at least one of: a Universal Serial Bus (USB) controller, a network controller, or a storage controller.

4. The security processor of claim 1, wherein the first and second public keys are fused into the security processor.

5. The security processor of claim 1, wherein a first entity is associated with the first secure boot public key, wherein a second entity is associated with the second secure boot public key, and wherein the first change of control or ownership is from the first entity to the second entity.

6. The security processor of claim 5, wherein the first entity is an Original Equipment Manufacturing (OEM) entity, and wherein the second entity is a customer or brand of the OEM entity.

7. The security processor of claim 5, further comprising a first counter configured to be incremented in response to the first change of control or ownership and a second counter configured to be incremented in response to a second change of control or ownership of the security processor from the second entity to the first entity, wherein to render the first public key unusable to initiate the first secure boot processes, the program instructions, upon execution by the core, further cause the security processor to read the first and second counters.

8. The security processor of claim 7, wherein the program instructions, upon execution by the core, further cause the security processor to, in response to the second change of control or ownership:
render the second public key unusable to initiate the second secure boot process; and
render the first public key usable to initiate the first secure boot process.

9. The security processor of claim 8, wherein the second change of control or ownership is associated with an equipment return, service, or warranty claim.

10. The security processor of claim 8, wherein to render the first or second public keys usable or unusable to initiate the first or second secure boot processes, the program instructions, upon execution by the core, further cause the security processor to read the first and second counters.

11. The security processor of claim 10, wherein the program instructions, upon execution by the core, further cause the security processor to:
store a third public key usable to initiate a third secure boot process and unusable to initiate the first and second secure boot processes; and
in response to a third change of control or ownership of the security processor from the first entity to a third entity, render the first public key unusable to initiate the first secure boot process.

12. The security processor of claim 11, wherein the third entity is another customer or brand of the OEM entity.

13. The security processor of claim 11, wherein the first counter increments in response to the third change of control or ownership, and wherein to render the first public key unusable to initiate the first secure boot process, the program instructions, upon execution by the core, further cause the security processor to read the first and second counters.

14. A non-transitory computer-readable storage medium having program instructions stored thereon that, upon execution by an Information Handling System (IHS) under control or ownership of an Original Equipment Manufacturer (OEM) entity, cause the IHS to:
initiate a first secure boot process using a first public key fused into a security processor, wherein the first public key is usable to initiate a first secure boot process, and wherein the first secure boot process excludes access to a first set of one or more controllers; and
in response to a change of control or ownership of the IHS from the OEM entity to a customer entity, increment a first one-way counter within the security processor, wherein the incremented first one-way counter renders: (i) the first public key unusable to initiate the first secure boot process, and (ii) a second public key fused into the security processor usable to initiate the second secure boot process, and wherein the second secure boot process excludes access to a second set of one or more controllers.

15. The non-transitory computer-readable storage medium of claim 14, wherein the program instructions, upon execution, further cause the IHS to, in response to a change of control or ownership of the IHS from the customer entity to the OEM entity, increment a second one-way counter within the security processor, wherein the incremented second one-way counter renders the first public key usable to initiate the first secure boot process and the second public key unusable to initiate the second secure boot process.

16. The non-transitory computer-readable storage medium of claim 15, wherein the program instructions, upon execution, further cause the IHS to, in response to another change of control or ownership of the IHS from the OEM entity to another entity, re-increment the first one-way counter within the security processor, wherein the re-incremented first one-way counter renders the first public key unusable to initiate the first secure boot process and a third public key fused into the security processor usable to initiate a third secure boot process.

17. A method, comprising:
- initiating, by a second entity, a second secure boot process of an Information Handling System (IHS) using a second public key fused into a security processor of the IHS, wherein the second secure boot process excludes access to a second controller; and
- in response to a change of control or ownership of from the second entity to a first entity, incrementing a second one-way counter within the security processor, wherein the incremented second one-way counter renders: (i) the second public key unusable to initiate the second secure boot process, and (ii) a first public key fused into the security processor usable to initiate a first secure boot process, wherein the first secure boot process excludes access to a first controller.

18. The method of claim 17, wherein the first entity is an Original Equipment Manufacturing (OEM) entity, wherein the second entity is a customer or brand of the OEM entity, and wherein the change of control or ownership is associated with a return, service, or warranty claim.

19. The method of claim 17, wherein the first controller comprises at least one of: a Universal Serial Bus (USB) controller, a network controller, or a storage controller, wherein the second controller comprises a fuse controller.

* * * * *